(12) United States Patent
Matsumoto et al.

(10) Patent No.: US 12,117,426 B2
(45) Date of Patent: Oct. 15, 2024

(54) BIOLOGICAL MEMBRANE PHOSPHOINOSITIDE SEPARATION METHOD

(71) Applicants: SHIMADZU CORPORATION, Kyoto (JP); THE UNIVERSITY OF TOKYO, Tokyo (JP)

(72) Inventors: Keiko Matsumoto, Kyoto (JP); Yuta Shimanaka, Tokyo (JP); Nozomu Kono, Tokyo (JP); Hiroyuki Arai, Tokyo (JP)

(73) Assignees: SHIMADZU CORPORATION, Kyoto (JP); THE UNIVERSITY OF TOKYO, Tokyo (JP)

( * ) Notice: Subject to any disclaimer, the term of this patent is extended or adjusted under 35 U.S.C. 154(b) by 836 days.

(21) Appl. No.: 17/272,973

(22) PCT Filed: Aug. 30, 2019

(86) PCT No.: PCT/JP2019/034134
§ 371 (c)(1),
(2) Date: Mar. 3, 2021

(87) PCT Pub. No.: WO2020/054462
PCT Pub. Date: Mar. 19, 2020

(65) Prior Publication Data
US 2021/0310999 A1 Oct. 7, 2021

(30) Foreign Application Priority Data

Sep. 10, 2018 (JP) .................... 2018-168584

(51) Int. Cl.
*G01N 30/34* (2006.01)
*B01D 15/40* (2006.01)
(Continued)

(52) U.S. Cl.
CPC ............ *G01N 30/34* (2013.01); *B01D 15/40* (2013.01); *B01J 20/24* (2013.01); *B01J 20/3204* (2013.01);
(Continued)

(58) Field of Classification Search
CPC ....... B01D 15/40; B01J 20/24; B01J 20/3204; B01J 20/285; G01N 2030/8813;
(Continued)

(56) References Cited

U.S. PATENT DOCUMENTS

2017/0002022 A1* 1/2017 Braun .................. A61P 35/00
2018/0340937 A1* 11/2018 Janetopoulos .......... G01N 33/92

FOREIGN PATENT DOCUMENTS

CN 105021758 A * 11/2015
JP 2015215320 A * 12/2015
WO WO-2018016645 A1 * 1/2018 ............ C07F 9/117

OTHER PUBLICATIONS

Czaplicki, Sylwester. (2013). Chromatography in Bioactivity Analysis of Compounds. 10.5772/55620. (Year: 2013).*

(Continued)

*Primary Examiner* — Jennifer Wecker
*Assistant Examiner* — Jonathan Bortoli
(74) *Attorney, Agent, or Firm* — Renner, Otto, Boisselle & Sklar, LLP

(57) ABSTRACT

Provided is a method for separating PIPs by which isomers of PIPs can be separated without deacylating the PIPs. The method includes at least a separation step of injecting a sample containing a plurality of PIPs into an analysis flow path of a supercritical fluid chromatograph having a separation column filled with a separation medium containing β-cyclodextrin and separating the plurality of PIPs by supercritical fluid chromatography.

3 Claims, 4 Drawing Sheets

(51) Int. Cl.
  B01J 20/24 (2006.01)
  B01J 20/32 (2006.01)
  G01N 30/06 (2006.01)
  G01N 30/16 (2006.01)
  G01N 30/72 (2006.01)

(52) U.S. Cl.
  CPC ............ G01N 30/06 (2013.01); G01N 30/16 (2013.01); G01N 30/72 (2013.01)

(58) Field of Classification Search
  CPC ........ G01N 30/06; G01N 30/16; G01N 30/34; G01N 30/72
  See application file for complete search history.

(56) References Cited

OTHER PUBLICATIONS

Salvador et al. "Chiral supercritical fluid chromatography on porous graphitic carbon using commercial dimethyl β-cyclodextrins as mobile phase additive" Journal of Chromatography A, vol. 929, Issues 1-2, 2001, pp. 101-112, ISSN 0021-9673, (Year: 2001).*
JP 2015-215320 A English machine translation (Year: 2015).*
CN 105021758A, English machine translation (Year: 2015).*
Li "Isomer Selective Comprehensive Lipidomics Analysis of Phosphoinositides in Biological Samples by Liquid Chromatography with Data Independent Acquisition Tandem Mass Spectrometry") Cite this: Anal. Chem. 2021, 93, 27, 9583-9592 (Year: 2021).*
Cheung "Targeted Phosphoinositides Analysis Using High-Performance Ion Chromatography-Coupled Selected Reaction Monitoring Mass Spectrometry" Journal of Proteome Research 2021 20 (6), 3114-3123 DOI: 10.1021/acs.jproteome.1c00017 (Year: 2021).*
WO-2018016645-A1 English translation (Year: 2018).*
Office Action for corresponding CN Application No. 201980046921.2 dated Nov. 15, 2022, with English translation.
Ivanova et al.; Glycerophospholipid Identification and Quantitation by Electrospray Ionization Mass Spectrometry; Methods in Enzymology; vol. 432, 2007.
Wang et al.; Determination of eight phospholipid components in egg yolk lecithin by superficial fluid chromatography; Chin J. Pharm Anal, 2016, with English machine translation.
Clark et al.; Quantification of PtdInsP3 molecular species in cells and tissues by mass spectrometry; Nature Methods; vol. 8, No. 3, Mar. 2011.
Hiroki Nakanishi et al.; Development of mass spectrometer-based system for simultaneous determination of inositol phospholipids; Lipid Biochemistry 54; pp. 88-89; May 28, 2012.
Ryo Taguchi et al.; Current status of mass spectrometry technology for measurement of trace lipid components; Experimental Medicine; vol. 28, No. 20; 2010.
International Search Report for corresponding Application No. PCT/JP2019/034134, mailed Nov. 26, 2019.
Written Opinion for corresponding Application No. PCT/JP2019/034134, mailed Nov. 26, 2019 (Partial English Translation).

* cited by examiner

BIOLOGICAL MEMBRANE PHOSPHOINOSITIDE SEPARATION METHOD

TECHNICAL FIELD

The present invention relates to a method for separating biological membrane phosphoinositides, which are phospholipids in which the hydroxyl groups are phosphorylated at at least one of the 3-, 4-, or 5-position of the inositol ring of phosphatidylinositol.

BACKGROUND ART

As shown in FIG. 1, there are seven phosphoinositides (hereinafter, referred to as PIPs) of PI(3)P, PI(4)P, PI(5)P, PI(3,4)$P_2$, PI(3,5)$P_2$, PI(4,5)$P_2$, and PI(3,4,5)$P_3$. These PIPs differ from each other in the number and the position of phosphorylation.

In the case that the PIPs have the same diacylglycerol (DG), three PIPs of PI(3)P, PI(4)P, and PI(5)P and three PIPs of PI(3,4)$P_2$, PI(3,5)$P_2$, and PI(4,5)$P_2$ are each three isomers and the three isomers have the same mass. Therefore, in order to quantify the seven PIPs individually, it is necessary to separate the isomers by chromatography.

However, a method for separating isomers of PIPs by chromatography has not been established. Therefore, a method has been conventionally employed in which isomers of PIPs are quantified as a whole without separating them, or in which PIPs are cleaved into a diacylglycerol and an inositol ring (deacylated) and the isomers are separated using the inositol ring moieties. (See Non-Patent Documents 1 and 2).

PRIOR ART DOCUMENTS

Non-Patent Documents

Non-Patent Document 1: Development of Method of Simultaneous Quantitative Analysis of Inositol Phospholipids Using Mass Spectrometer, Hiroki Nakanishi, Junko Sasaki, Takehiko Sasaki et al., Proceedings of Japanese Conference on the Biochemistry of Lipids, Vol. 54, P 88-89, 2012

Non-Patent Document 2: Current Status of Mass Spectrometry Technology for Measuring Trace Lipid Components, Ryo Taguchi, Hiroki Nakanishi, Experimental Medicine, Vol. 28, No. 20 (special edition), 2010

SUMMARY OF THE INVENTION

Problems to be Solved by the Invention

In the method of quantifying isomers of PIPs as a whole without separating them, PIPs are quantified by diacylglycerols (DGs) regarding PI(3)P, PI(4)P, and PI(5)P as $PIP_1$ and PI(3,4)$P_2$, PI(3,5)$P_2$, and PI(4,5)$P_2$ as $PIP_2$. Therefore, each isomer cannot be quantified.

In the method of deacylating PIPs and separating the isomers using the inositol ring moieties, PIPs can be quantified by inositol ring moieties, but information on the DG cannot be obtained.

An object of the present invention is to provide a separation method by which isomers of PIPs can be separated without deacylating the PIPs.

Solutions to the Problems

The present inventors have found that isomers of PIPs can be separated without deacylating the PIPs by supercritical fluid chromatography using a separation column filled with a separation medium in which β-cyclodextrin is bound to the stationary phase. It is considered that the use of the separation medium containing β-cyclodextrin in supercritical chromatography, which has higher molecular shape recognition ability than liquid chromatography, causes a plurality of interactions to PIPs such as hydrophobic interaction, hydrogen bond, inclusion, and electrostatic interaction as shown in FIG. 4, and the actions function to separate isomers of PIPs that are not deacylated although such isomers have been difficult to separate. $R_1$ in FIG. 4 is a spacer including an alkyl group and a polar group.

That is, the method for separating PIPs according to the present invention includes a separation step of separating a plurality of biological membrane phosphoinositides using supercritical fluid chromatography by injecting a sample containing the plurality of PIPs into an analysis flow path of a supercritical fluid chromatograph having a separation column filled with a separation medium containing β-cyclodextrin.

Therefore, the separation method of the present invention is suitable for separating a sample containing a plurality of isomers of PIPs.

The plurality of isomers are any of PI(3)P, PI(4)P, PI(5)P, PI(3,4)$P_2$, PI(3,5)$P_2$, PI(4,5)$P_2$, and PI(3,4,5)$P_3$.

The method preferably includes a derivatization step of derivatizing a phosphate group of the plurality of PIPs contained in the sample by trimethylsilyldiazomethane before the separation step, and a detection step of detecting each of the plurality of PIPs, which are separated by the separation column, using a mass spectrometer after the separation step. By such a method, it is possible to quantitatively analyze, by a mass spectrometer, the PIPs containing each of the isomers separated through the separation column filled with the separation medium containing β-cyclodextrin, so that it is possible to realize individual quantification of the plurality of PIPs contained in the sample.

In the separation step, a formic acid methanol aqueous solution can be used as a modifier.

Effects of the Invention

The method for separating PIPs according to the present invention includes a separation step of separating a plurality of biological membrane phosphoinositides using supercritical fluid chromatography by injecting a sample containing a plurality of PIPs into an analysis flow path of a supercritical fluid chromatograph having a separation column filled with a separation medium containing β-cyclodextrin. Therefore, isomers of PIPs can be separated by the method without deacylating the PIPs.

EMBODIMENT OF THE INVENTION

Hereinafter, an example of the method for separating PIPs according to the present invention will be described with reference to the drawings.

Figure 1:
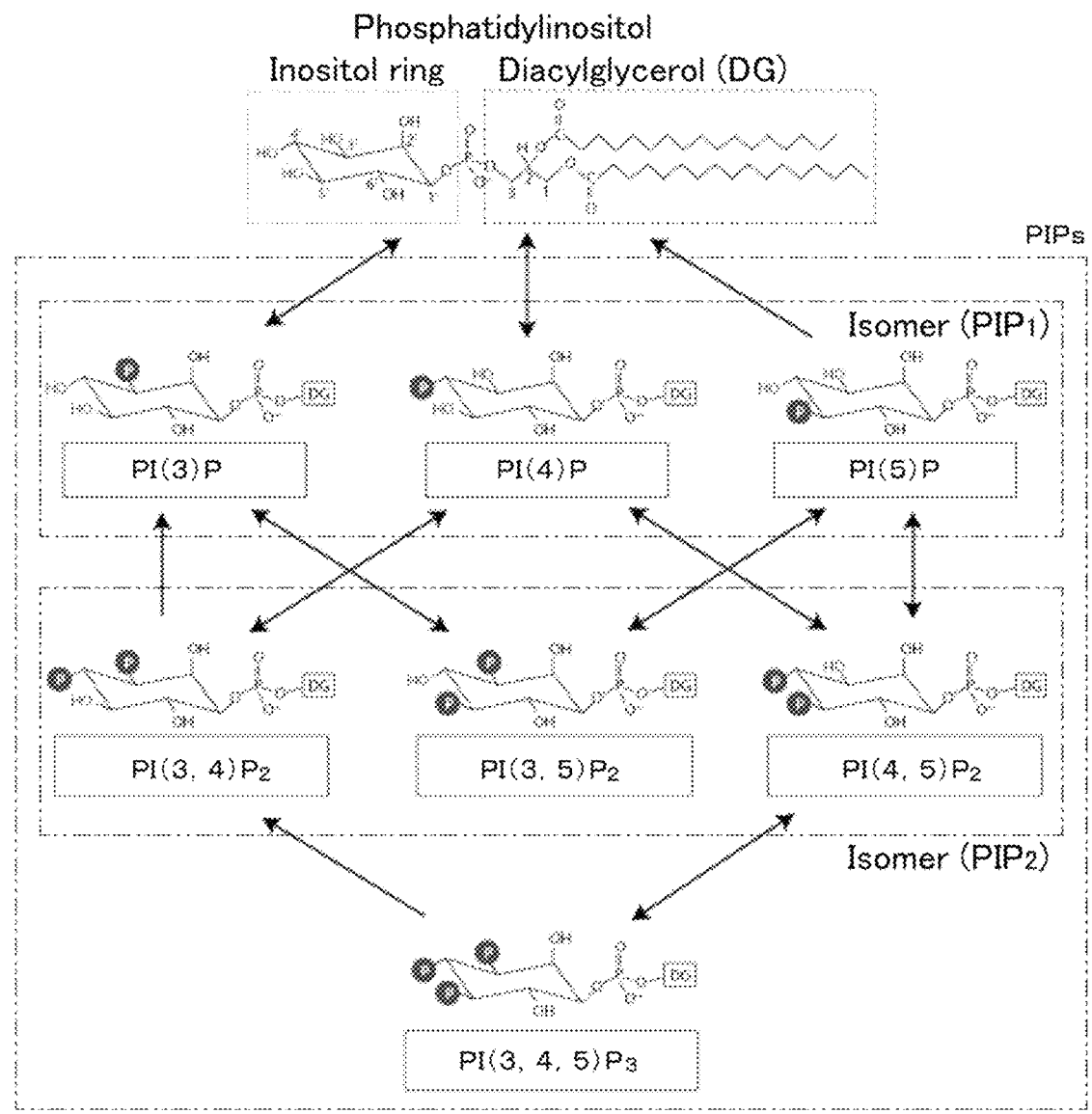
FIG. 1 shows structural formulae showing the structures of phosphatidylinositol and PIPs.
Figure 2:
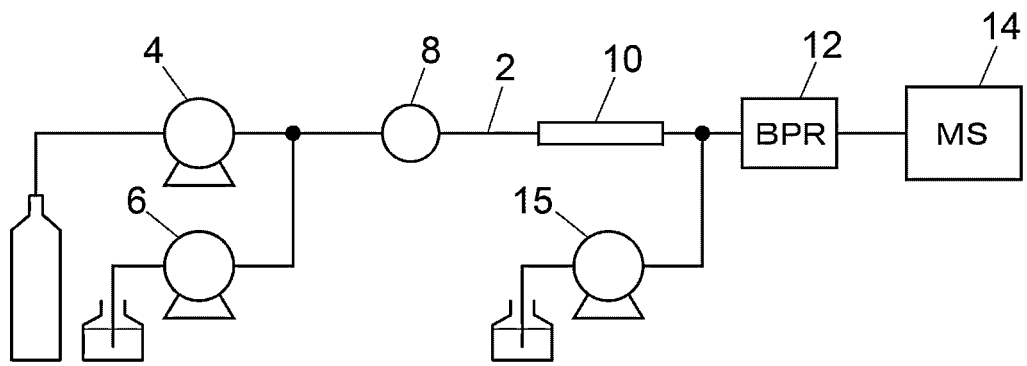
FIG. 2 is a flow path configuration diagram showing the configuration of a supercritical fluid chromatograph.

The method for separating PIPs in this example is performed using a supercritical fluid chromatograph (hereinafter, referred to as SFC). As shown in FIG. 2, the SFC used in this example includes solvent delivery pumps 4 and 6 for feeding of carbon dioxide and a modifier in an analysis flow path 2, a sample injection part 8 for injection of a sample into the analysis flow path 2 in which the fluid mixture of the carbon dioxide and the modifier flows, a separation column 10 for separation of the sample injected through the sample injection part 8, a back pressure regulator (BPR) 12 that controls the pressure in the analysis flow path 2 to a predetermined pressure so that at least the carbon dioxide flowing through the separation column 10 is in a supercritical state, a pump 15 that feeds a makeup solvent for sensitive detection, and a mass spectrometer (MS) 14 provided in the post-side of the BPR 12.

Although not shown, the separation column 10 is installed in a column oven and is constantly controlled to a set temperature. The separation column 10 is filled with a separation medium in which cyclodextrin capable of including an organic substance is bound to a silica stationary phase. For example, ULTRON AF-HILIC-CD manufactured by Shinwa Chemical Industries Ltd. can be used.

In order to enable separation and analysis of a sample containing a plurality of PIPs by the SFC, the phosphate group of the PIPs in the sample is derivatized to make each of the PIPs detectable by the MS 14.

The derivatization treatment can be performed, for example, by the following procedures (1) to (5).

(1) To a sample solution containing PIPs, 2 M trimethylsilyldiazomethane hexane solution is added.
(2) The sample solution to which the 2 M trimethylsilyldiazomethane hexane solution is added is left at room temperature for a certain period of time (for example, 10 minutes) to perform a derivatization reaction.
(3) To the sample solution, glacial acetic acid is added under a nitrogen atmosphere to stop the derivatization reaction.
(4) A predetermined washing solution (for example, a mixture of chloroform:methanol:water=8:4:3) is added and mixed to the sample solution, and then the resulting solution is centrifuged to recover the lower layer. Washing may be repeated in the same manner a plurality of times. Finally, a solution of methanol:water=9:1 is added to the sample solution.
(5) The sample solution is dried and solidified under a nitrogen atmosphere. Then, a predetermined amount of methanol is added to the sample, and the sample is dissolved by ultrasonic waves. In addition, a predetermined amount of water is added to the sample.

Derivatization of PIPs as described above is disclosed in the paper "Quantification of PtdInsP3 molecular species in cells and tissues by mass spectrometry, Jonathan Clark, Karen E Anderson, Veronique Juvin, Trevor S Smith, Fredrik Karpe, Michael J O Wakelam, Len R Stephens & Phillip T Hawkins".

As a modifier for supercritical fluid chromatography, a mixture of 0.1% formic acid methanol and water (for example, formic acid methanol:water=97.5:2.5) can be used. Furthermore, methanol containing formic acid or ammonium formate (for example, 0.1% formic acid methanol) can be used as the modifier.

Figure 3:
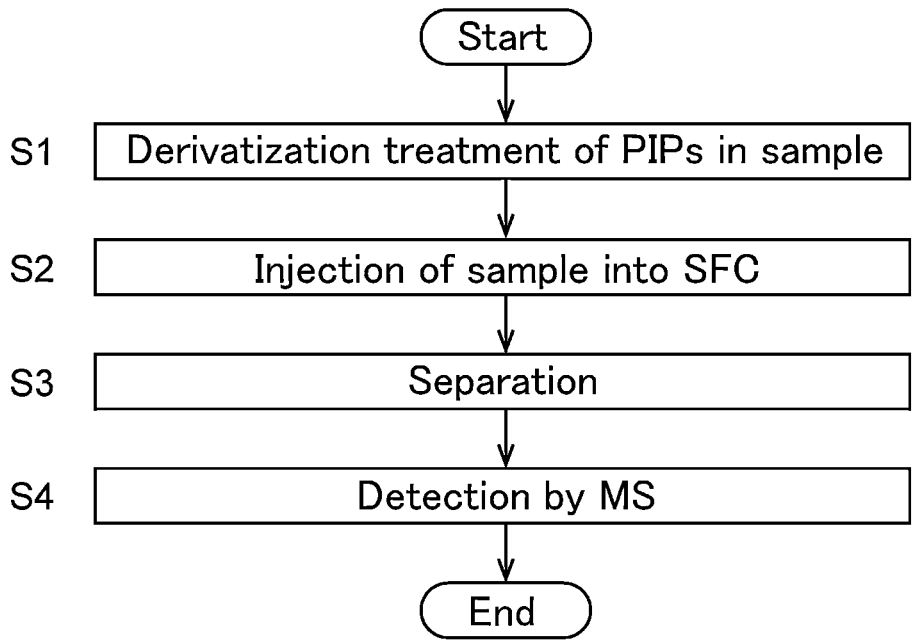
FIG. 3 is a flowchart showing an example of a method for separating PIPs.
Figure 4:
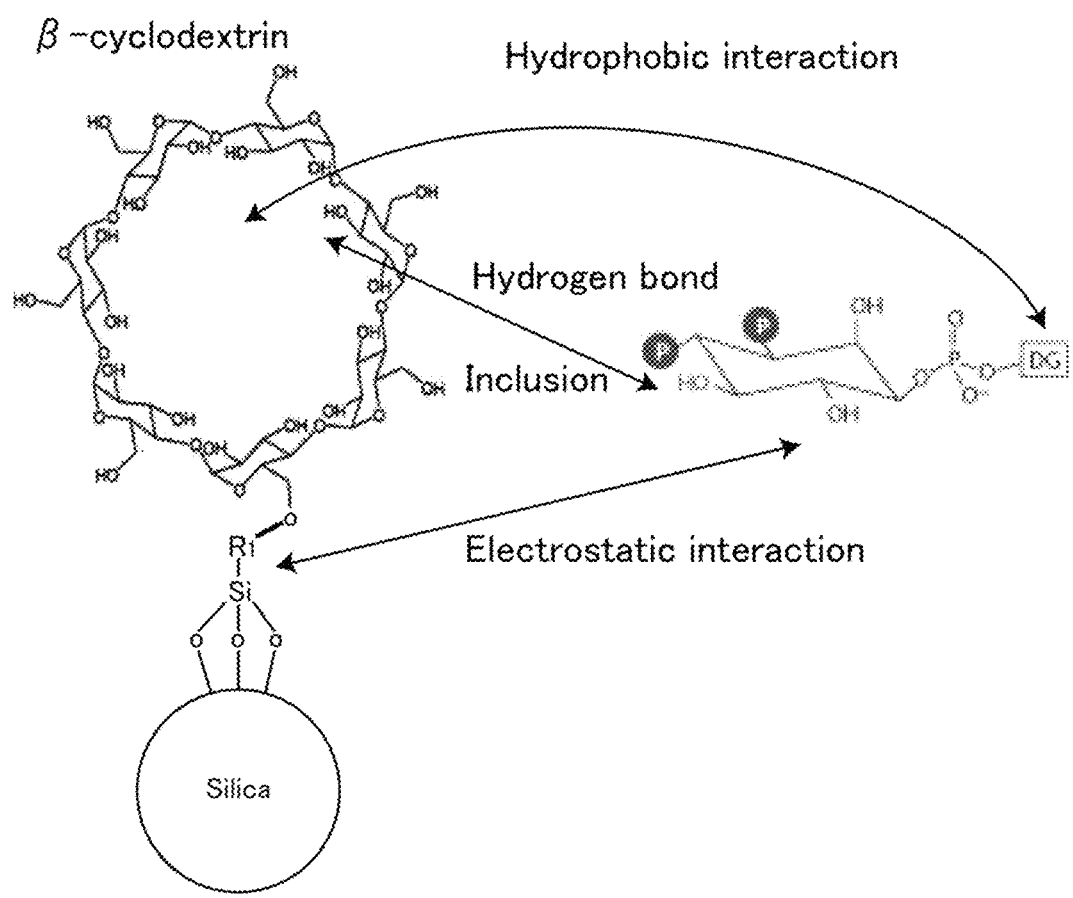
FIG. 4 is a diagram for illustrating the interaction between a separation medium containing β-cyclodextrin and PIPs.

That is, in the method for separating PIPs in this example, as shown in the flowchart of FIG. 3, the above-described derivatization treatment is performed (step S1), then the sample is injected into the analysis flow path 2 of the SFC through the sample injection part 8 (step S2), and the isomers of the PIPs are separated by the separation column 10 filled with the separation medium in which cyclodextrin is bound to the silica stationary phase (step S3). Furthermore, each of the PIPs separated by the separation column 10 is introduced into the MS 14 one by one and detected (step S4).

Figure 5:
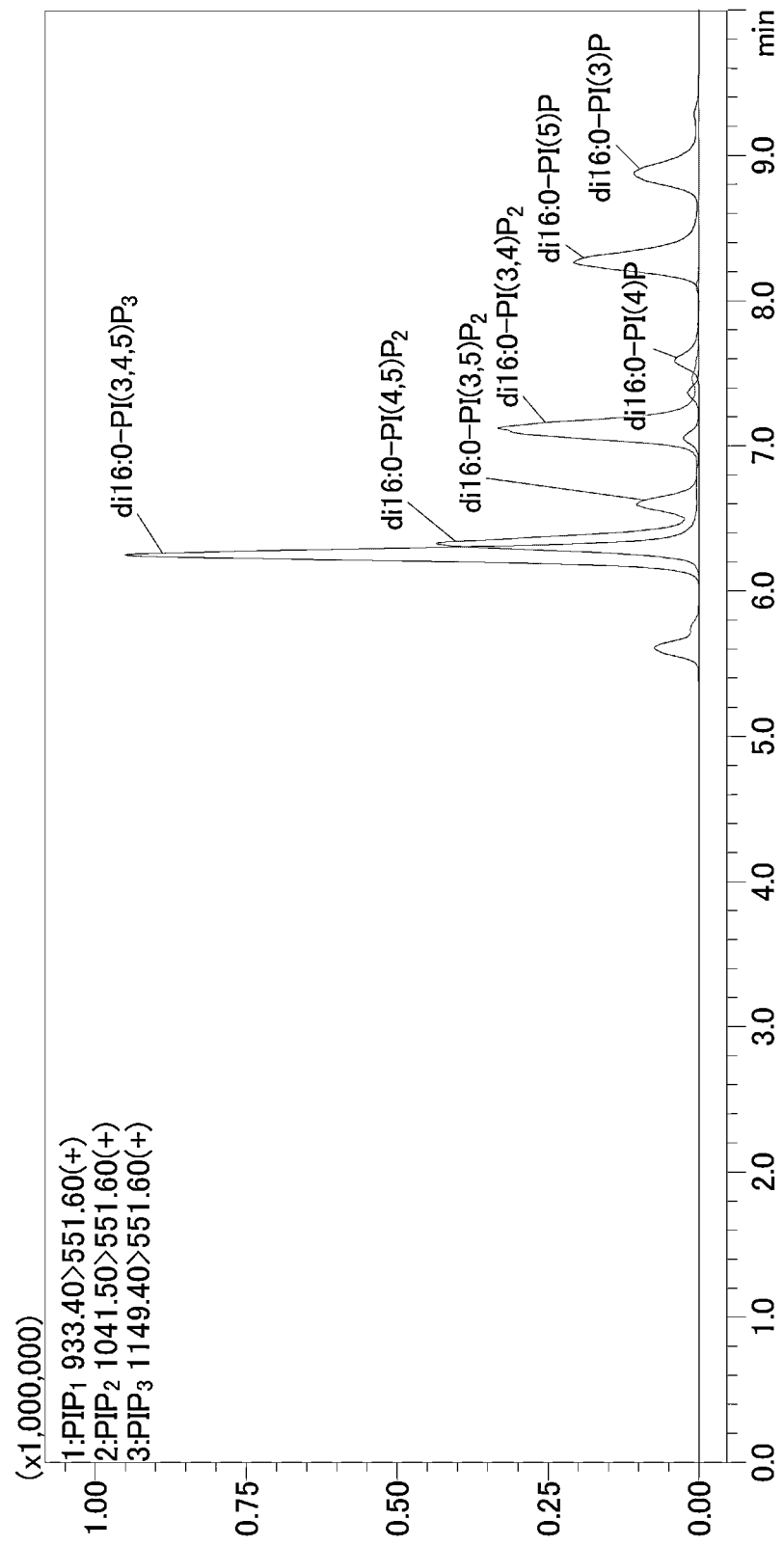
FIG. 5 is an example of a chromatogram based on a mass spectrometer signal obtained by the method for separating PIPs shown in FIG. 3.

FIG. 5 is a chromatogram obtained by analyzing a sample containing seven PIPs of PI(3)P, PI(4)P, PI(5)P, PI(3,4)P$_2$, PI(3,5)P$_2$, PI(4,5)P$_2$, and PI(3,4,5)P$_3$ using the method in the above-described example. The horizontal axis shows the time and the vertical axis shows the signal intensity. In this analysis, ULTRON AF-HILIC-CD (inner diameter: 4.6 mm, length: 250 mm) manufactured by Shinwa Chemical Industries Ltd. was used as the separation column 10, and the set temperature of the separation column 10 was 4° C. As the modifier, a mixture of 0.1% formic acid methanol and water (for example, formic acid methanol:water=97.5:2.5) was used, and the modifier concentration in the mobile phase was changed by time so as to be 5% in a time zone of 0 to 7 minutes, 30% in a time zone of 7.01 to 10 minutes, and 5% in a time zone of 10.01 to 16 minutes. The flow rate of the mobile phase was 3 mL/min, the flow rate of the makeup solvent was 0.1 mL/min, and the set pressure of the BPR 12 was 10 MPa.

From the chromatogram of FIG. 5, it can be seen that three isomers of PI(3)P, PI(4)P, and PI(5)P and three isomers of PI(3,4)P$_2$, PI(3,5)P$_2$, and PI(4,5)P$_2$ are separated. The three PIPs of PI(3)P, PI(4)P, and PI(5)P and the three PIPs of PI(3,4)P$_2$, PI(3,5)P$_2$, and PI(4,5)P$_2$ are each three isomers. Although the three isomers have the same mass, each isomer can be individually detected and quantified by the MS 14 because the isomers are separated by the SFC.

As described above, it can be seen that the combination of an SFC having a separation column filled with a separation medium in which cyclodextrin is bound to a silica stationary phase and an MS enables individual quantification of seven PIPs.

DESCRIPTION OF REFERENCE SIGNS

2: Analysis flow path
4, 6, 15: Solvent delivery pump
8: Sample injection part
10: Separation column
12: Back pressure regulator (BPR)
14: Mass spectrometer (MS)

The invention claimed is:

1. A method of separating non-deacylated phosphatidylinositol 3-phosphate PI(3)P, non-deacylated phosphatidylinositol 4-phosphate PI(4)P, and non-deacylated PI(5)P phosphatidylinositol 5-phosphate from one another, or of separating non-deacylated phosphatidylinositol 3,4-bisphosphate PI(3,4)P2, non-deacylated phosphatidylinositol 3,5-bisphosphate PI(3,5)P2, and non-deacylated phosphatidylinositol 4-5-bisphosphate PI(4,5)P2 from one another using a supercritical fluid chromatograph having an analysis flow path, a silica stationary phase, a separation medium and a separation column packed with the separation medium in which β-cyclodextrin is bound to the silica stationary phase, the method comprising injecting a first sample containing non-deacylated phosphatidylinositol 3-phosphate PI(3)P, non-deacylated phosphatidylinositol 4-phosphate PI(4)P, and non-deacylated phosphatidylinositol 5-phosphate PI(5)P, or injecting a second sample containing non-deacylated phosphatidylinositol 3,4-bisphosphate PI(3,4)P2, non-deacylated PI(3,5)P2, and non-deacylated PI(4,5)P2 into the analysis flow path and thereby separating the non-deacylated phosphatidylinositol 3-phosphate PI(3)P, the non-deacylated phosphatidylinositol 4-phosphate PI(4)P, and the non-deacylated PI(5)P phosphatidylinositol 5-phosphate from one another, or separating the non-deacylated phosphatidylinositol 3,4-bisphosphate PI(3,4)P2, the non-deacylated phosphatidylinositol 3,5-bisphosphate PI(3,5)P2, and the non-deacylated phosphatidylinositol 4-5-bisphosphate PI(4,5)P2 from one another.

2. The method according to claim 1, further comprising:
   derivatizing a phosphate group of the non-deacylated phosphatidylinositol 3-phosphate PI(3)P, the non-deacylated phosphatidylinositol 4-phosphate PI(4)P, and the non-deacylated PI(5)P phosphatidylinositol 5-phosphate, or of the non-deacylated phosphatidylinositol 3,4-bisphosphate PI(3,4)P2, the non-deacylated phosphatidylinositol 3,5-bisphosphate PI(3,5)P2, and the non-deacylated phosphatidylinositol 4-5-bisphosphate PI(4,5)P2 using trimethylsilyldiazomethane before the separating; and the non-deacylated phosphatidylinositol 3,4-bisphosphate PI(3,4)P2, the non-deacylated phosphatidylinositol 3,5-bisphosphate PI(3,5)P2, and the non-deacylated phosphatidylinositol 4-5-bisphosphate PI(4,5)P2 or detecting the non-deacylated phosphatidylinositol 3,4-bisphosphate PI(3,4)P2, the non-deacylated phosphatidylinositol 3,5-bisphosphate PI(3,5)P2, and the non-deacylated phosphatidylinositol 4-5-bisphosphate PI(4,5)P2, which are separated using the separation column, using a mass spectrometer after the separating.

3. The method according to claim 1, further comprising adding a formic acid methanol aqueous solution modifier to the separation column during the separating.

* * * * *